United States Patent
Jakoubovitch et al.

(10) Patent No.: US 9,799,454 B1
(45) Date of Patent: Oct. 24, 2017

(54) HIGH POWER CAPACITOR

(71) Applicant: Celem Passive Components LTD., Jerusalem (IL)

(72) Inventors: Anat Jakoubovitch, Jerusalem (IL); Benjamin Jakoubovitch, Jerusalem (IL); Gad Yaron, Jerusalem (IL)

(73) Assignee: Celem Passive Components LTD., Jerusalem (IL)

( * ) Notice: Subject to any disclaimer, the term of this patent is extended or adjusted under 35 U.S.C. 154(b) by 0 days.

(21) Appl. No.: 15/603,520

(22) Filed: May 24, 2017

Related U.S. Application Data (60) Provisional application No. 62/503,458, filed on May 9, 2017.

(51) Int. Cl.
*H01G 4/005* (2006.01)
*H01G 4/40* (2006.01)
*H01G 4/236* (2006.01)
*H01G 4/258* (2006.01)

(52) U.S. Cl.
CPC ............... *H01G 4/40* (2013.01); *H01G 4/005* (2013.01); *H01G 4/236* (2013.01); *H01G 4/258* (2013.01)

(58) Field of Classification Search
None
See application file for complete search history.

(56) References Cited

U.S. PATENT DOCUMENTS

| | | | |
|---|---|---|---|
| 1,599,853 A | 9/1926 | Toelle | |
| 3,018,427 A * | 1/1962 | Marbury | H01G 4/236 361/274.3 |
| 3,035,237 A * | 5/1962 | Schlicke | H01G 4/35 333/182 |
| 4,315,299 A | 2/1982 | Saint Marcoux et al. | |
| 4,317,159 A | 2/1982 | Dequasie | |
| 4,587,144 A * | 5/1986 | Kellerman | H01B 17/305 174/152 GM |
| 4,719,539 A | 1/1988 | Lavene | |
| 4,788,624 A * | 11/1988 | Strange | H01G 4/40 361/272 |
| 4,926,111 A * | 5/1990 | Lungu | H01F 5/00 323/355 |
| 5,953,201 A | 9/1999 | Jakoubovitch | |
| 6,549,098 B1 * | 4/2003 | Bernard | H03H 1/0007 333/181 |
| 6,894,886 B2 | 5/2005 | Eriksson et al. | |

(Continued)

FOREIGN PATENT DOCUMENTS

| | | |
|---|---|---|
| EP | 0214788 | 3/1987 |
| EP | 1263007 | 12/2002 |

(Continued)

*Primary Examiner* — Dion R Ferguson
(74) *Attorney, Agent, or Firm* — Manelli Selter PLLC; Edward J. Stemberger (57) ABSTRACT

An AC capacitor including a first electrode with an electrically conductive rod protruding from surface of the first electrode, a second electrode including an opening, a bobbin located between the first and the second electrode the bobbin includes a hollow central section. The axis of the electrically conductive rod protruding from surface of the first electrode is coaxial with axis of the hollow bobbin and the electrically conductive rod passes through the hollow central section of the bobbin and through the opening in the second electrode allowing current flow.

16 Claims, 5 Drawing Sheets

(56) References Cited

U.S. PATENT DOCUMENTS

| | | | |
|---|---|---|---|
| 8,416,556 B2 | 4/2013 | Grimm et al. | |
| 2007/0112398 A1* | 5/2007 | Stevenson | A61N 1/05 607/63 |
| 2007/0242413 A1 | 10/2007 | Drugge | |
| 2009/0273916 A1 | 11/2009 | Hironaka | |
| 2012/0098589 A1* | 4/2012 | Spanier | B82Y 10/00 327/530 |

FOREIGN PATENT DOCUMENTS

| | | |
|---|---|---|
| WO | 2008092073 | 7/2008 |
| WO | 2009116046 | 9/2009 |
| WO | 2016000786 | 1/2016 |

\* cited by examiner

HIGH POWER CAPACITOR

TECHNOLOGY FIELD

The present capacitor relates to AC power capacitors and in particular to AC power capacitors that conduct high currents at high frequency under high voltage.

BACKGROUND

High voltage alternating current (AC) power capacitors are designed to meet the mechanical, electrical, and performance requirements of high voltage high frequency AC electrical circuits. Such capacitors commonly used in electrical circuits carrying peak voltages of, for example, 1400 Vpeak and electrical current of 3000 $A_{rms}$ are prone to heating by three main mechanisms.

The first cause of heating of the capacitor are dielectric losses which originate from the physical and chemical properties of the dielectric material used in as an insulator in the capacitor.

The second source of heat are Ohmic loses. These losses are created by the current which flows on the different resistances (usually referred to as ESR, ESL) of the capacitor. For example, in a common high and medium frequency (e.g., 1 kHz to 1 MHz) power capacitor each 500 kVAr reactive power can generate a loss of 500 to 1000 Watt from dielectric and Ohmic losses in the form of heat.

The last source of heat, are the inductive losses. Depending on the method of mounting, the capacitor is prone to induction heating. High currents which flow from the capacitor towards the collector or consumer and/or inductor create a magnetic field which can heat the capacitor by induction.

Heating of the capacitors by the three mechanisms described above limits the number of capacitors one can use in a high voltage alternating current (AC) circuit as well as the configuration in which the capacitors can be lined up. For example, certain configurations of mounting more than one capacitor to a bus such as, for example, in parallel, may bring one or more capacitors, e.g., the first or last in the series, to overheat. Derating the capacitors and therefore using a larger number of capacitors may be needed in a system due to overheating of the capacitors.

Solutions currently practiced for cooling capacitors include running a liquid coolant through an individual capacitor or mounting capacitors on cooling busses that dissipate the heat via conduction.

Despite all of the described above measures induction heating capacitors still exhibit significant power dissipation due to the enormous AC currents they must carry and the magnetic field which is created by these currents. Therefore an important factor in their design is directing the currents in such a way that minimizes the stray effects, such as heating by induction of the capacitor itself and allowing the effective removal of heat from within the capacitor and hence extend the life of the capacitor.

The following US Patents and Patent Application Publications describe different power capacitors and methods of using such capacitors U.S. Pat. No. 1,599,853, U.S. Pat. No. 4,315,299, U.S. Pat. No. 4,317,159, U.S. Pat. No. 4,719,539, U.S. Pat. No. 5,953,201, U.S. Pat. No. 6,894,886, U.S. Pat. No. 8,416,556, US 2007/0242413, US 2009/0273916, European Patents EP 0214788, EP1263007, and Patent Cooperation Treaty Publications WO 2008/092073, WO 2009/116046 and WO 2016/000786.

Definitions

As used in the current disclosure the term "reactive current" is the phasor of alternating current, the component of the current perpendicular to the voltage which contributes no power. In the presence of Ohmic impedance or dielectric material, part of the reactive current will interact with the material generating losses which are compensated by active currents from the power supply. Practically the angle between voltage and current will become less than 90 degrees. Reactive power exists in an AC circuit when the current and voltage are not in phase. Reactive power is measured in kVAr units.

SUMMARY

Described is an AC capacitor configured to be used with an AC current supply bus. The structure of the AC capacitor facilitates prevention of harmful influence of a magnetic field generated on the AC capacitor when the AC capacitor is connected to an AC current supply bus. The AC capacitor uses a magnetic field created by it to enhance the performance of the capacitor. The AC capacitor includes a first electrode with an electrically conductive rod protruding from surface of the first electrode, a second electrode including an opening and a bobbin located between the first and the second electrodes. The opposite ends of the bobbin are in contact with the electrodes. The bobbin includes a hollow central section extending the length of the bobbin. The axis of the rod protruding from surface of the first electrode is coaxial with axis of the hollow bobbin and the rod passes through the hollow central section of the bobbin and through the opening in the second electrode.

The AC capacitor further includes a locking arrangement configured to create contact upon request with the bus bar. When the AC capacitor is connected to the AC current supply bus, an AC current flows through the bobbin in one direction and through the rod in the opposite direction. The AC current flowing in opposite directions in the bobbin and in the rod create a coaxial system in which the harmful magnetic fields balance each other avoiding heating of the capacitor, smoothing the current distribution in the capacitor.

BRIEF DESCRIPTION OF THE DRAWINGS

The present method and system will be understood and appreciated more fully from the following detailed description, taken in conjunction with the drawings in which according to referral numbers mark the parts.

DESCRIPTION

In prior art capacitors, the magnetic fields in the bobbin are non-uniform and hence the current flows in a non-uniform distribution causing excessive heat. As capacitors are limited by the hottest point which is the weakest point of the capacitor, the current capacitor will allow a better, more efficient use of the capacitor. The current capacitor forces the current to flow in a way which will create a uniform heating of the capacitor and consequently eliminate hotspots. This capacitor will support fast and simple mounting of a number of capacitors to a power supply bus and will concurrently reduce the thermal load for all mounted components on the power supply bus. These capacitors will make heat dissipation from each and every capacitor more efficient, removing limitations from capacitor power supply bus mounting configurations. Furthermore, they will cut back on labour and allow more efficient use of the power of the capacitor.

Figure 1A:
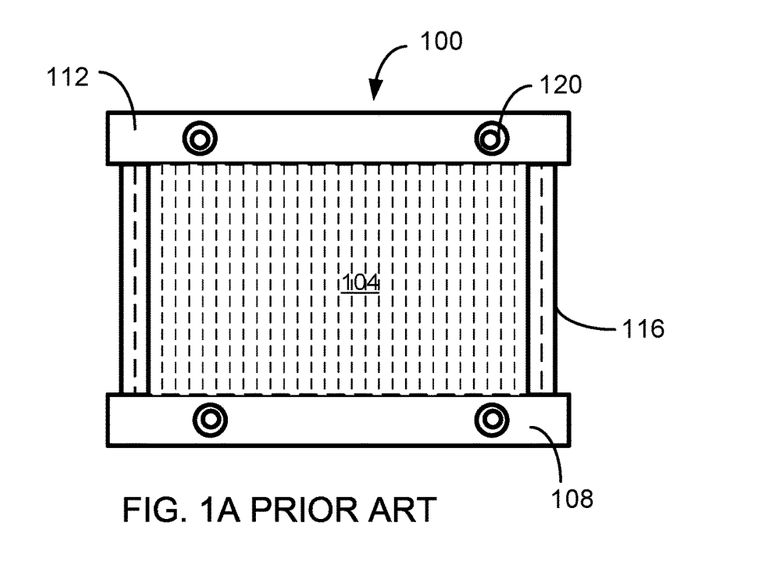
FIG. 1A is a schematic illustration of an existing power AC capacitor.
Figure 1B:
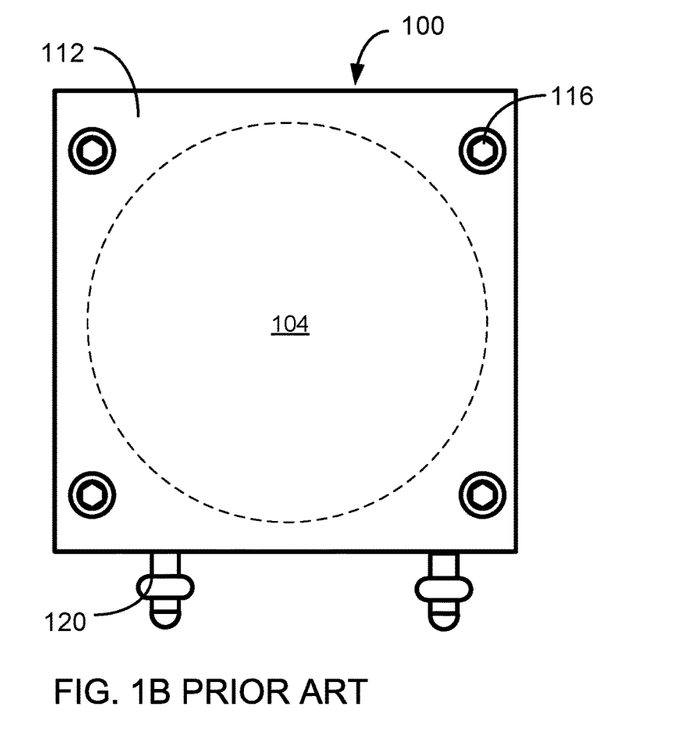
FIG. 1B is a top plan view of a power AC capacitor of FIG. 1A.

Reference is made to FIG. 1A is a schematic illustration of a prior art power AC capacitor. The high power capacitors 100 typically consist of interleaved dielectric (e.g. polypropylene) films and metal or metalized films electrodes. The dielectrics and electrodes are usually wound to form a multilayer bobbin 104 also termed winding. Bobbin 104 is typically located between two electrodes 108 and 112. Electrodes 108 and 112 are electrically connected to opposing ends of the metal or metalized films by soldering or as shown in FIGS. 1A and 1B by pressure developed by one or more bolts 116 or other arrangement configured to apply pressure and hence create contact to the electrodes. Different tapping configurations support connection of power capacitor 100 to different loads. Such load could be a transformer, electric motor or induction heating coil. Electrodes 108 and 112 are cooled by a flow of a cooling fluid supplied through connecting pipes 120 or by conduction whilst mounting the capacitor on cooled bus bars.

In order to take advantage of the higher reactive power (kVAr) capacity of a given sized capacitor unit, it is necessary to provide means for cooling the unit to remove the heat generated in the dielectric, and the reactive power (kVAr) rating which can be given to the unit depends on the effectiveness of the cooling means in removing this heat and keeping the temperature of the dielectric within safe limits.

Figure 2A:
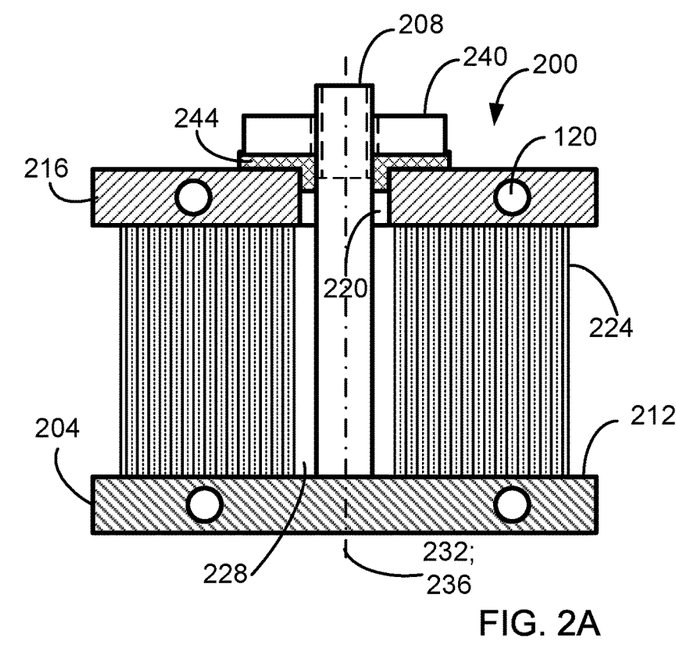
FIG. 2A is a schematic illustration of an example of a power AC capacitor.

FIG. 2A is a schematic illustration of an example of a present power AC capacitor. Power AC capacitor 200 includes a first electrode 204 including an electrically conductive rod 208 protruding from surface 212 of first electrode 204, a second electrode 216 including an opening 220 and a bobbin 224 located between first 204 and second 216 electrode, the bobbin includes a hollow central section 228 extending the length of the bobbin. Axis 232 of electrically conductive rod 208 protruding from surface 212 of first electrode 204 is coaxial with axis 236 of hollow bobbin 224 and rod 208 passes through the hollow central section 228 extending the length of bobbin 224 and through opening 220 in second electrode 216.

Electrically conductive rod 208 protruding from surface 212 of first electrode 204 is terminated by a locking arrangement configured to engage a locking element 240 and create contact upon request with a bus bar (not shown), which could be a cooling bus or an electrical bus or both. Locking element 240 and the locking arrangement of rod 208 could be threads or other fastening means. Electrically conductive rod 208 and locking element 240 could be made of any electrically conductive material, for example brass or copper and the rod could be attached to first electrode 204 or integral (unitary) with the first electrode. The cross section of rod 208 would typically be a solid or tubular round cross section although other cross sections such as litz wire, elliptical, square, triangular and polygonal cross sections could be of use.

AC capacitor 200 is further including an element 244 electrically isolating electrically conductive rod 208 and a locking element 240 from second electrode 216. When locking element 240 does not form a contact with the bus bar (300, FIG. 3) there is no connection between first electrode 204 and the bus bar hence no current can flow on the capacitor.

Figure 2B:
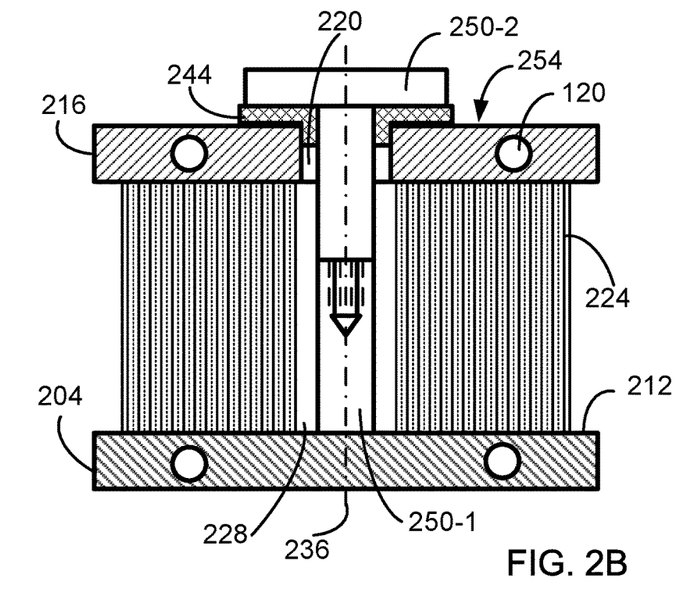
FIG. 2B is a schematic illustration of another example of a power AC capacitor.

FIG. 2B is a schematic illustration of another example of a power AC capacitor. Current conductive rod 250 of capacitor 254 is implemented as a two element rod. First element 250-1 of current conductive rod 250 could be attached to first electrode 204 or made integral (unitary) with the first electrode. Second element 250-2 is a fixing or locking element. Elements 250-1 and 250-2 of rod 250 could be made of any electrically conductive material and have a solid cross section, although a tubular cross section could be used. Axes of electrically conductive rod 250 elements 250-1 and 250-2 are coaxial with axis 236 of hollow central section 228 of bobbin or winding 224. Conductive rod element 250-2 is at least partially located in hollow central section 228 of bobbin 224 and passes through opening 220 in second electrode 216.

Figure 3A:
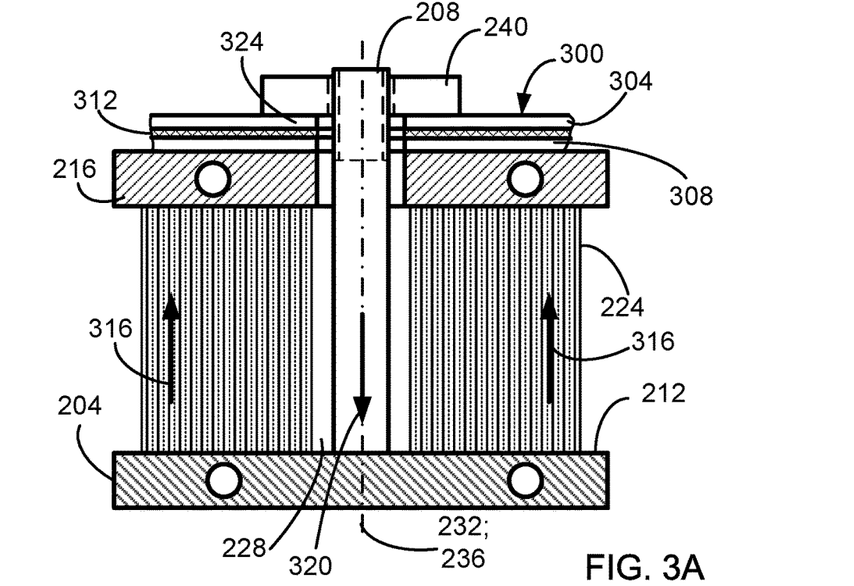
FIG. 3A is a schematic illustration of an example of a present power AC capacitor connected to a power supply bus.

FIG. 3A is a schematic illustration of an example of a power AC capacitor connected to a power or current conducting bus. Current conducting bus 300 includes two electrodes 304 and 308 and a layer of electrically isolating material 312 isolating electrode 304 from electrode 308. Current conducting bus 300 could be of a relatively large size sufficient to accept four, ten or any number AC capacitors. Alternating current shown by arrows 316 and flowing in a first direction through the capacitor winding or bobbin 224 generates an electromagnetic field that causes power dissipation and energy losses. When electrically conductive rod 208 or (250) is located inside hollow central section 228 of bobbin 224 and rod 208 axis 232 is coaxial with axis 236 of hollow central section 228, magnetic field generated by current 316 flowing in bobbin 224 neutralizes the magnetic field generated by current 320 in rod 208. Current shown by arrow 320 in rod 208 is in the opposite direction to current 316 flowing in bobbin 224.

Figure 3B:
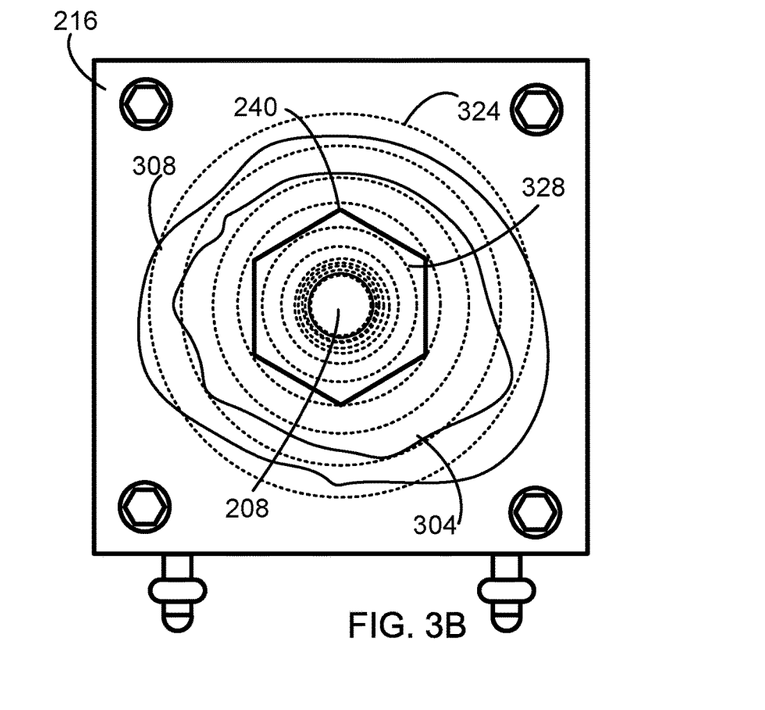
FIG. 3B is a schematic illustration of a magnetic field induced between elements of a power supply bus with a present power AC capacitor mounted to the power supply bus.
Figure 3C:
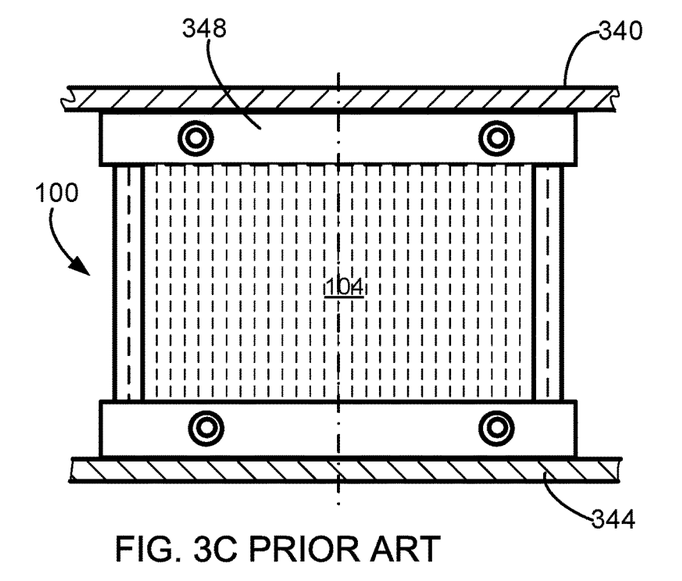
FIG. 3C is a schematic illustration of an example of an existing power AC capacitor mounted to a conventional power supply bus.
Figure 3D:
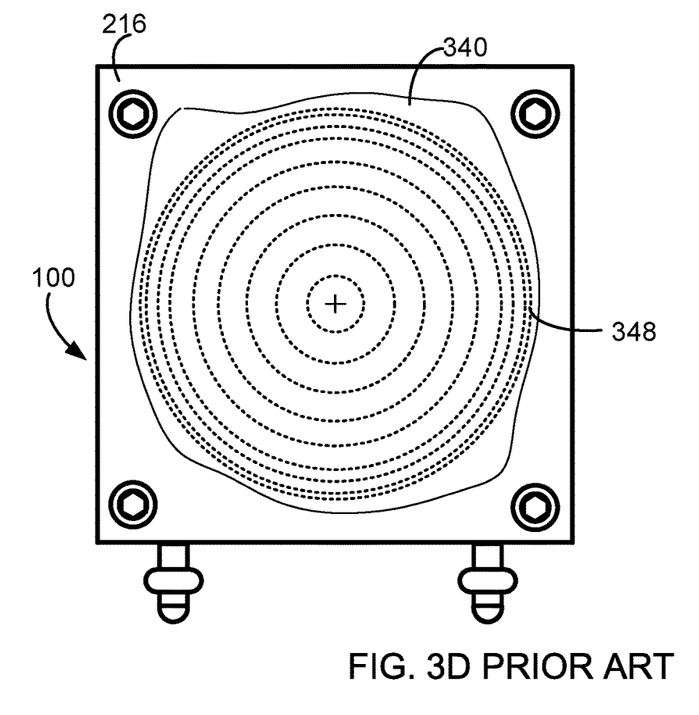
FIG. 3D is a schematic illustration of a magnetic field induced between elements of a power supply bus with an existing power AC capacitor mounted to the conventional power supply bus.

FIG. 3B illustrates the magnetic field by concentric circular lines 324. The dotted lines which are concentrated in the center and decay towards the circumference of the bobbin represent the magnetic field induced by the electric current in the electrically conductive rod 208 which has maximum strength in proximity to the rod 208 and decay towards the circumference of the bobbin. FIG. 3D illustrates the magnetic field by concentric circular lines 348. The dotted concentric circular lines which are sparse at the center of the bobbin and become dense towards the circumference represent the magnetic field induced by the electric current in the bobbin 224 (which is opposite in direction to the electric current in the rod 208).

The magnetic field created by the electric current in electrically conductive rod 208 is in opposite direction to the magnetic field created by the current in bobbin 224. The superposition of the two magnetic fields, shown by lines 324 and 348, is a redistributed balanced magnetic field which causes the electric current in the bobbin to be distributed more uniformly across the bobbin 224.

AC capacitor 200 (FIG. 2A, 2B) with a rod 208 may safely handle electrical current with a magnitude twice or more times higher than commercially available similar capacitors.

Induction heating of materials is one of the applications of high power AC capacitors. An induction heating apparatus includes an induction power supply, which delivers an alternating current to a work coil creating an electromagnetic field within the coil. The work piece is placed in the coil where this field induces a current in the work piece, which generates heat in the work piece.

The requirements for capacitors used in high power induction heating are quite demanding for any type of capacitor. The high operating frequency (kilohertz up to Megahertz) and enormous currents and voltages are causing significant losses due to dielectric heating, ohmic losses and magnetic fields developed in and in proximity to the capacitor.

Therefore an important factor in their design is directing the currents in such a way that minimize the heating by induction of the capacitor itself and allowing the effective removal of heat from within the capacitor and hence extend the life of the capacitor. The present capacitor meets all of these requirements better than any commercially available similar capacitors.

Figure 4:
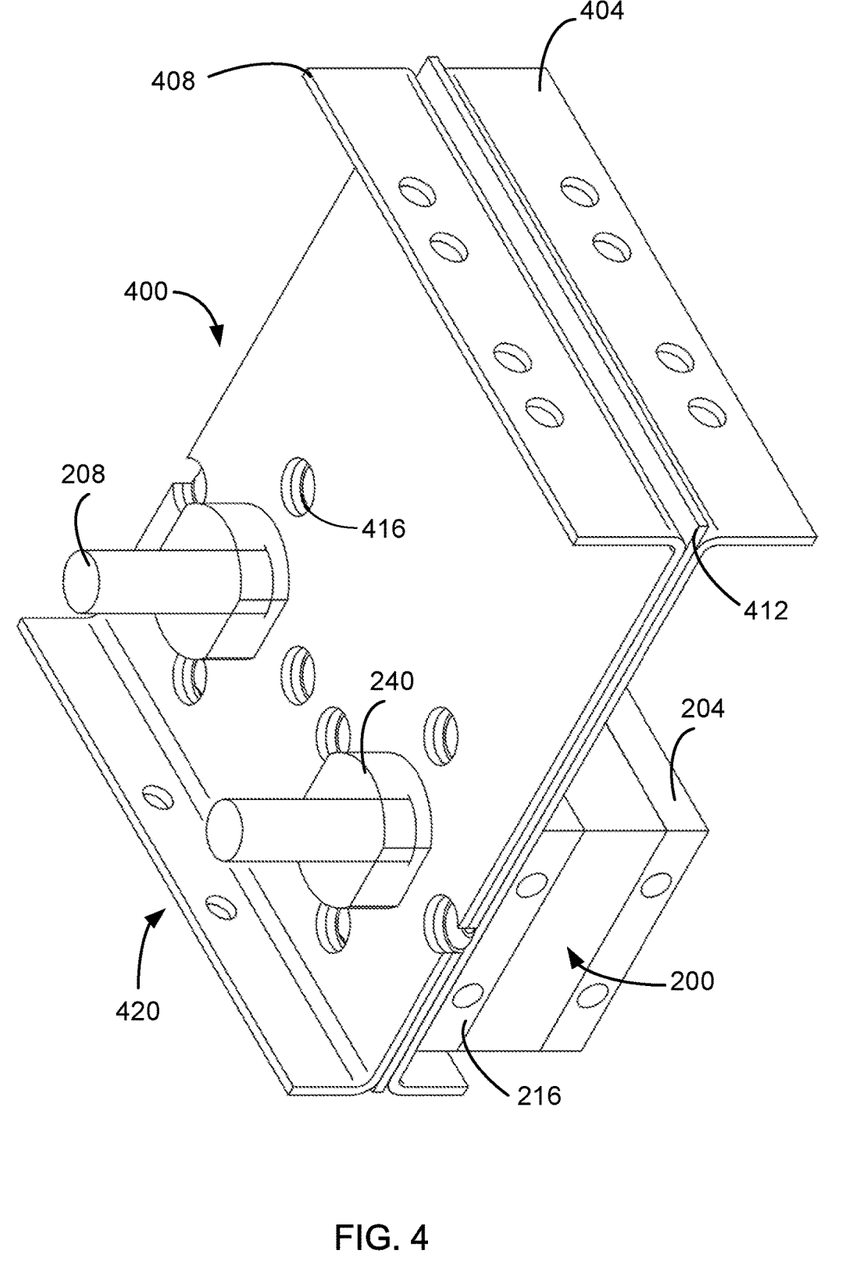
FIG. 4 is a schematic illustration of an example of an induction heating apparatus equipped by a present power AC capacitor.

FIG. 4 is a schematic illustration of an example of an induction heating apparatus equipped by a present power AC capacitor. Induction heating apparatus 400 includes a current conducting bus 404 and 408 and connection 420 to work coil. Apparatus 400 includes two electrodes 404 and 408 and a layer of electrically isolating material 412 isolating electrode 404 from electrode 408. Although two power AC capacitor 200 are mounted on apparatus 400, the size of current conducting bus is large enough to accept four, ten or any number of AC capacitors. Four fasteners schematically illustrated by their mounting holes 416 attach electrode 216 of AC capacitor to induction heating apparatus 400 and in particular to electrode 404. It is clear that any other number of fasteners that support mechanical mounting of capacitor 200 could be used. Mounting of capacitor 200 to electrode 404 also facilitates electrical contact between electrode 216 of capacitor 200 and electrode 404 of apparatus 400.

As explained above, due to the coaxial relation between the axis of rod 208 and axis 236 of bobbin 224 (FIGS. 2 and 3), the net magnetic field is redistributed, reducing the overall temperature of the capacitor and eliminating hot spots. Accordingly, apparatus 400 can safely handle current several times higher than an apparatus with a similar capacitors without the present capacitors 200.

It will be appreciated by persons skilled in the art that the present capacitor is not limited to what has been particularly shown and described hereinabove. Rather, the scope of the capacitor and its use includes both combinations and sub-combinations of various features described hereinabove as well as modifications and variations thereof which would occur to a person skilled in the art upon reading the foregoing description and which are not in the prior art.

What is claimed is:

1. An AC capacitor comprising:
   a first electrode including an electrically conductive rod protruding from surface of the first electrode;
   a second electrode including an opening; and
   a bobbin located between the first and the second electrode and having a portion extending into the opening, the bobbin includes a hollow central section;
   wherein an axis of the electrically conductive rod protruding from surface of the first electrode is coaxial with an axis of the hollow central section of the bobbin, and wherein when AC voltage is supplied to the first and second electrodes, the bobbin is constructed and arranged to permit current to flow in a first direction generating an electromagnetic field, and the electrically conductive rod is constructed and arranged to permit current to flow in a second, opposite direction, creating an opposing magnetic field.

2. The AC capacitor of claim 1 wherein the electrically conductive rod is one of a group of electrically conductive rods consisting of a rod attached to the first electrode or integral (unitary) with the first electrode.

3. The AC capacitor of claim 1 wherein an end of the electrically conductive rod protruding from the surface of the first electrode is terminated by a locking arrangement configured to create contact with a bus bar.

4. The AC capacitor of claim 1 wherein cross section of the electrically conductive rod is one of a group of cross sections consisting of a solid or hollow round, elliptical, multi-strand (litz wire) and polygonal cross sections.

5. The AC capacitor of claim 1 further comprising a locking element configured to engage a locking arrangement of the electrically conductive rod.

6. The AC capacitor of claim 5 wherein the locking element and the locking arrangement of the electrically conductive rod are threads.

7. The AC capacitor of claim 1 wherein length of the electrically conductive rod and locking element supports introduction of an additional element between the electrode and a locking element, and wherein the additional element is a power supply bus.

8. The AC capacitor of claim 1 wherein the hollow central section extends the length of the bobbin.

9. An AC capacitor comprising:
   a first electrode including a first element protruding from the first electrode and wherein the first element includes a first locking arrangement;
   a second electrode located opposite the first electrode and including an opening;
   a winding with a hollow central section, the winding extends between the first and the second electrode; and
   a fixing element including a second locking arrangement configured to engage the first locking arrangement via the opening;
   wherein an axis of the first element of the first electrode, an axis of the fixing element, and an axis of the winding are coaxial; and
   wherein when the first locking arrangement is engaged with the second locking arrangement securing the first electrode with the second electrode, the first and second locking arrangements define an electric current conductive rod allowing electric current to flow through the rod.

10. The AC capacitor of claim 9 wherein the locking arrangements of the first element and the fixing element are threads.

11. The AC capacitor of claim 9 wherein at least the fixing element is configured to create a contact with a bus bar.

12. The AC capacitor of claim 9 wherein a cross section of the rod is one of a group of cross sections consisting of a solid round, multi strand (litz wire), elliptical and polygonal cross sections.

13. The AC capacitor of claim 9 further including an element electrically isolating the first element and the fixing element from at least one of the electrodes.

14. A method of connecting and operating of an AC capacitor, comprising:
   providing an AC capacitor including:
      a first electrode and a second electrode and a bobbin located between the first and second electrode, the bobbin includes a hollow channel extending the length of the bobbin and an electric current conductive rod passing through the hollow channel of the bobbin and wherein axes of at least the electric current conducting rod and the bobbin are coaxial;
   supplying to the first and second electrode AC voltage and wherein the AC voltage generates in the bobbin a current flowing in a first direction and inducing a magnetic field, while the AC current generated in the rod flows in a second, opposite direction, creating an opposing magnetic field.

15. The method of claim 14 wherein a net magnetic field of the AC capacitor is distributed in a uniform manner and hence unifies the current distribution in the capacitor.

16. The method of claim 14, further comprising minimizing heat generated by the magnetic fields that affect each other.

* * * * *